(12) United States Patent
Peng (10) Patent No.: US 7,075,781 B2
(45) Date of Patent: Jul. 11, 2006

(54) LID MECHANISM FOR AN INTERFACE SLOT OPENING OF NOTEBOOK COMPUTERS

(75) Inventor: Po-Hsuan Peng, Miao-Li (TW)

(73) Assignee: Mitac Technology Corporation, Hsin-Chu (TW)

(*) Notice: Subject to any disclaimer, the term of this patent is extended or adjusted under 35 U.S.C. 154(b) by 125 days.

(21) Appl. No.: 10/943,449

(22) Filed: Sep. 17, 2004

(65) Prior Publication Data

US 2006/0007647 A1 Jan. 12, 2006

(30) Foreign Application Priority Data

Jul. 9, 2004 (TW) .............................. 93120649 A (51) Int. Cl.
*H05K 5/00* (2006.01)
(52) U.S. Cl. ....................................... 361/679; 361/686
(58) Field of Classification Search ................ 361/679, 361/683, 686
See application file for complete search history.

(56) References Cited

U.S. PATENT DOCUMENTS

| 5,097,388 | A | * | 3/1992 | Buist et al. .................. 361/686 |
| 5,155,659 | A | * | 10/1992 | Kunert ........................ 361/683 |
| 5,430,607 | A | * | 7/1995 | Smith ......................... 361/683 |
| 5,963,422 | A | * | 10/1999 | Golobay et al. ............. 361/686 |
| 6,788,529 | B1 | * | 9/2004 | Homer et al. ............... 361/683 |
| 2005/0152106 | A1 | * | 7/2005 | Coster et al. ............... 361/683 |

\* cited by examiner

*Primary Examiner*—Yean-Hsi Chang
(74) *Attorney, Agent, or Firm*—Welsh & Katz (57) ABSTRACT

A lid mechanism for an interface slot opening of notebook computers includes a notebook computer body, which has an interface slot opening on a lateral side and a first sliding trough formed on one side of the opening, and a lid located on the interface slot opening in a turning manner to close the opening. The lid includes a lid body, which has a recess on the surface in the center, an inner surface attaching to a water-proof plate and a second sliding trough on an upper side corresponding to the first sliding trough. The recess has a lever fastening to a latch arm and driving the latch arm, to move in the second sliding trough. When the lid is in a closed condition to compress the waterproof plate, the latch arm is wedged gradually in the first sliding trough.

20 Claims, 7 Drawing Sheets

LID MECHANISM FOR AN INTERFACE SLOT OPENING OF NOTEBOOK COMPUTERS

FIELD OF THE INVENTION

The present invention relates to a lid mechanism for an interface slot opening of notebook computers and particularly to a mechanism that has a lever structure to close a lid tightly to fend off moisture.

BACKGROUND OF THE INVENTION

Notebook computers generally have one or more interface slots on the backside or lateral sides to couple with connectors of different peripheral devices. When the interface slot is not in use, a lid to prevent external dusts from smearing the interface slot usually covers it.

Figure 1:
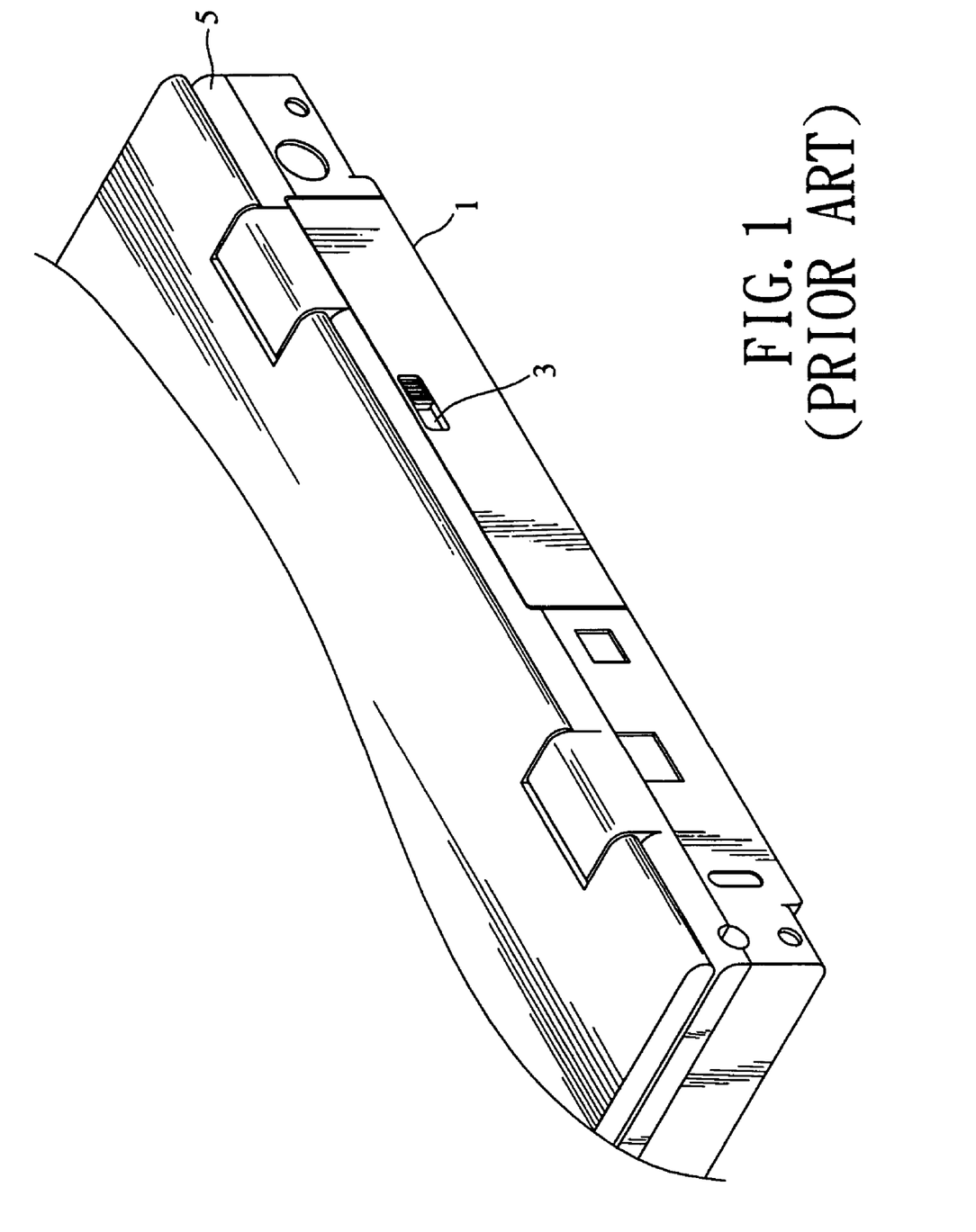
FIG. 1 is a schematic view of a conventional lid mechanism for an interface slot opening of a notebook computer.

There are many types of lid mechanisms to cover the interface slot and provide a dust-guarding function. FIG. 1 illustrates a lid 1 for a conventional notebook computer. The lid 1 has a latch structure 3. When in use, push the latch structure 3 to unlatch the case 5, the lid 1 may be turned outwards to expose the interface slot. When not in use, swing the lid 1 about stub shafts to cover the interface slot and move the latch structure 3 to latch on the case 5. Such a structure has a complicated structure that includes many delicate elements such as springs. It is not sturdy and cannot withstand the strong impact of external forces. Damage or dislocation of the springs often occurs. It does not have much shock-absorption capability. Moreover, it uses a sliding mechanism, which cannot prevent moisture from seeping into the interface slot when closed. Hence it also cannot provide a satisfactory waterproof function.

Figure 2:
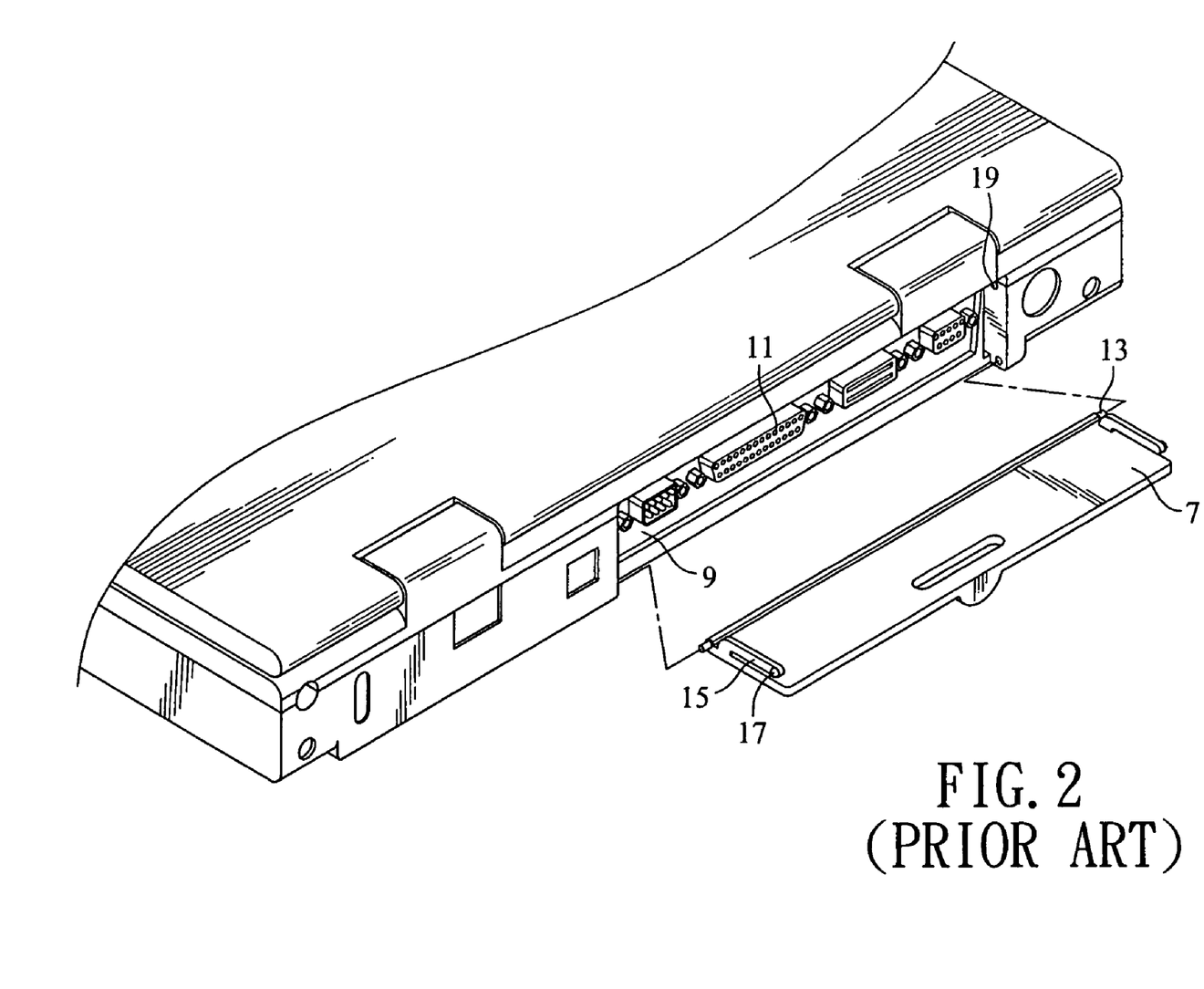
FIG. 2 is a schematic view of another conventional lid mechanism for an interface slot opening of a notebook computer.

Another conventional lid structure for the interface slot of notebook computers (R.O.C. patent publication No. 449244) is shown in FIG. 2. It has a lid 7 located on an input/output interface opening 9 of one side of the computer case. When the interface slot 11 is not in use, the lid 7 is turned about a pintle 13 and bulged elements 17 located on L-shape plates 15 of the lid 7 are moved to couple with latch cavities 19 formed on two sides of the interface slot 11 in a latched position. On the contrary, the lid 7 is opened when pulled forcefully. While it provides some degree of dust-guarding, it does not help much in the waterproof and shock-absorption functions.

SUMMARY OF THE INVENTION

In view of the aforesaid disadvantages, the object of the present invention is to provide a lid closing structure for notebook computers that employs a simple mechanism and is easy to use, and can cover the interface slot to guard against dusts and also to provide water-proof and shock-absorption functions.

In order to achieve the foregoing object, the lid mechanism according to the invention includes a notebook computer case, an interface slot opening on one side of the case, a first sliding trough on the upper side of the opening and a lid covering the opening in a turning manner. The lid includes:

a lid body which has an axle bore, a second sliding trough on a upper side corresponding to the first sliding trough, and a water-proof plate attached to an inner surface thereof; and a latch arm fastening to a lever through the axle bore and turning in the second sliding trough.

When the lid is in a closed condition to compress the waterproof plate, the latch arm may be wedged gradually in the first sliding trough.

The foregoing, as well as additional objects, features and advantages of the invention will be more readily apparent from the following detailed description, which proceeds with reference to the accompanying drawings.

DESCRIPTION OF THE PREFERRED EMBODIMENTS

In the following embodiments, the same notations mark elements of same or similar functions.

Figure 3:
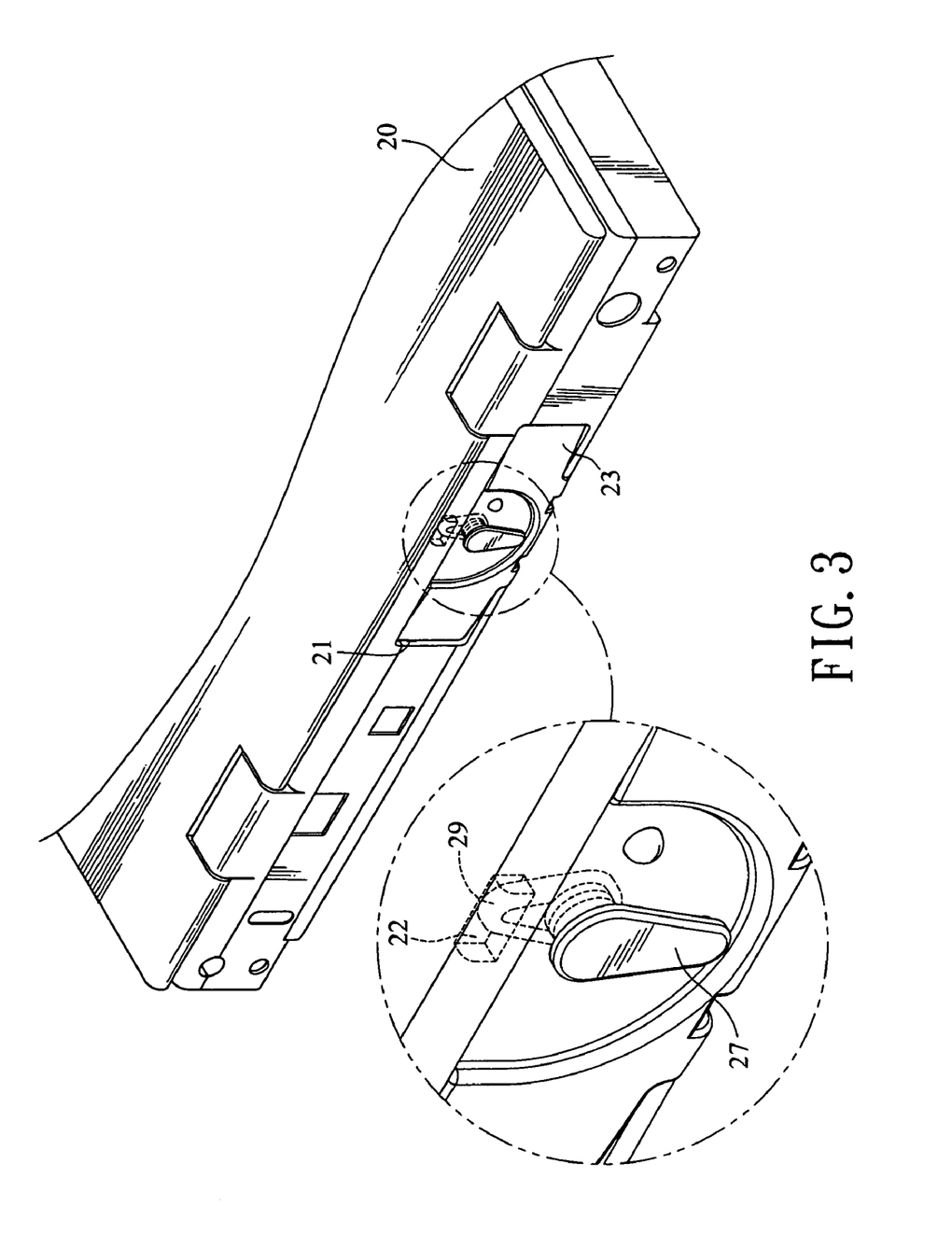
FIG. 3 is a schematic view of a first embodiment of the lid mechanism for an interface slot opening of a notebook computer of the invention.

Refer to FIG. 3 for an embodiment of the lid mechanism for an interface slot opening of notebook computers according to the invention. A notebook computer body 20 is shown. The body 20 has an interface slot opening 21 on one side and a lid 23 covering the opening in a turning manner.

The interface slot may be a USB port, RJ11 port, RJ45 port, parallel port, VGA port, IEEE1394 port, video output port (S terminal), SPDIF port (for optical fiber output), audio device (linear input jack, earphone output jack, microphone input pack), power supply input jack, SD card interface, PCMCIA interface, or the like.

Figure 4A:
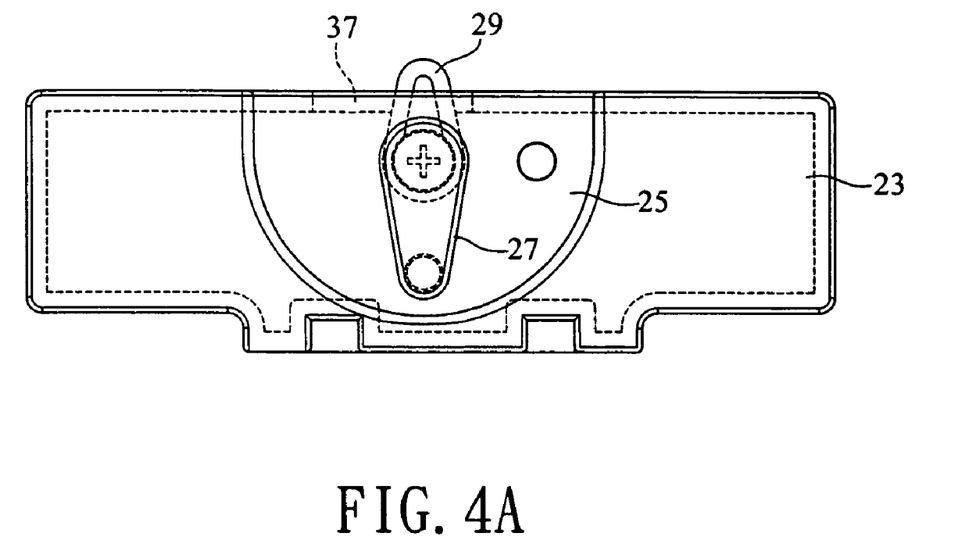
FIGS. 4A and 4B are schematic views of the embodiment of the lid mechanism of the invention in a closed and an open condition.
Figure 4B:
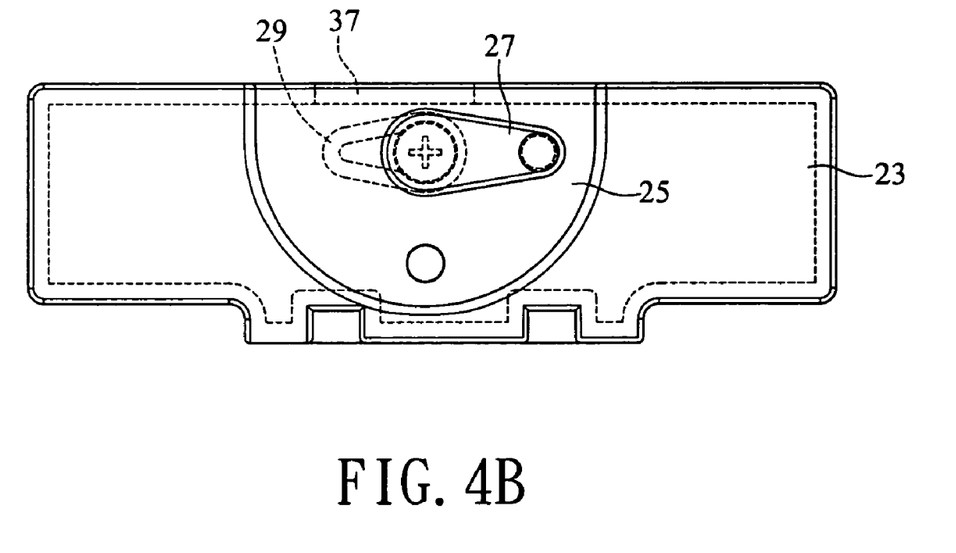

Referring to FIGS. 3, 4A and 4B, the lid 23 has stub shafts at the bottom of two sides to pivotally couple with corresponding apertures formed on the bottom of the opening 21. The lid body has an recess 25 formed on the surface to allow a lever 27 to move back and forth thereon in a unlatched or anchored position to open or close the lid. The lever 27 is fastened to a latch arm 29 to move together. When the lid 23 is in closed condition, a waterproof plate located on an inner side of the lid 23 is compressed. By moving the lever 27, the latch arm 29 is gradually wedged and latched under forces into a first sliding trough 22 formed on one edge of the opening 21 to anchor the lid 23 on the body 20 and cover the opening. With the latch arm latched in the first sliding trough under forces and the presence of the waterproof plate, moisture is prevented from entering the computer.

When the lever 27 is in an open and unlatched position, the latch arm 29 is moved to a second sliding trough 37 of the lid 23, and the lid 23 may be turned about the stub shafts and opened to expose the interface slot. Moreover, the rear side of the lid has a fastening element to fasten the lever 27 to the recess 25, an electromagnetic shield plate to prevent electromagnetic interference, and a waterproof plate to prevent moisture from entering the computer.

Figure 5:
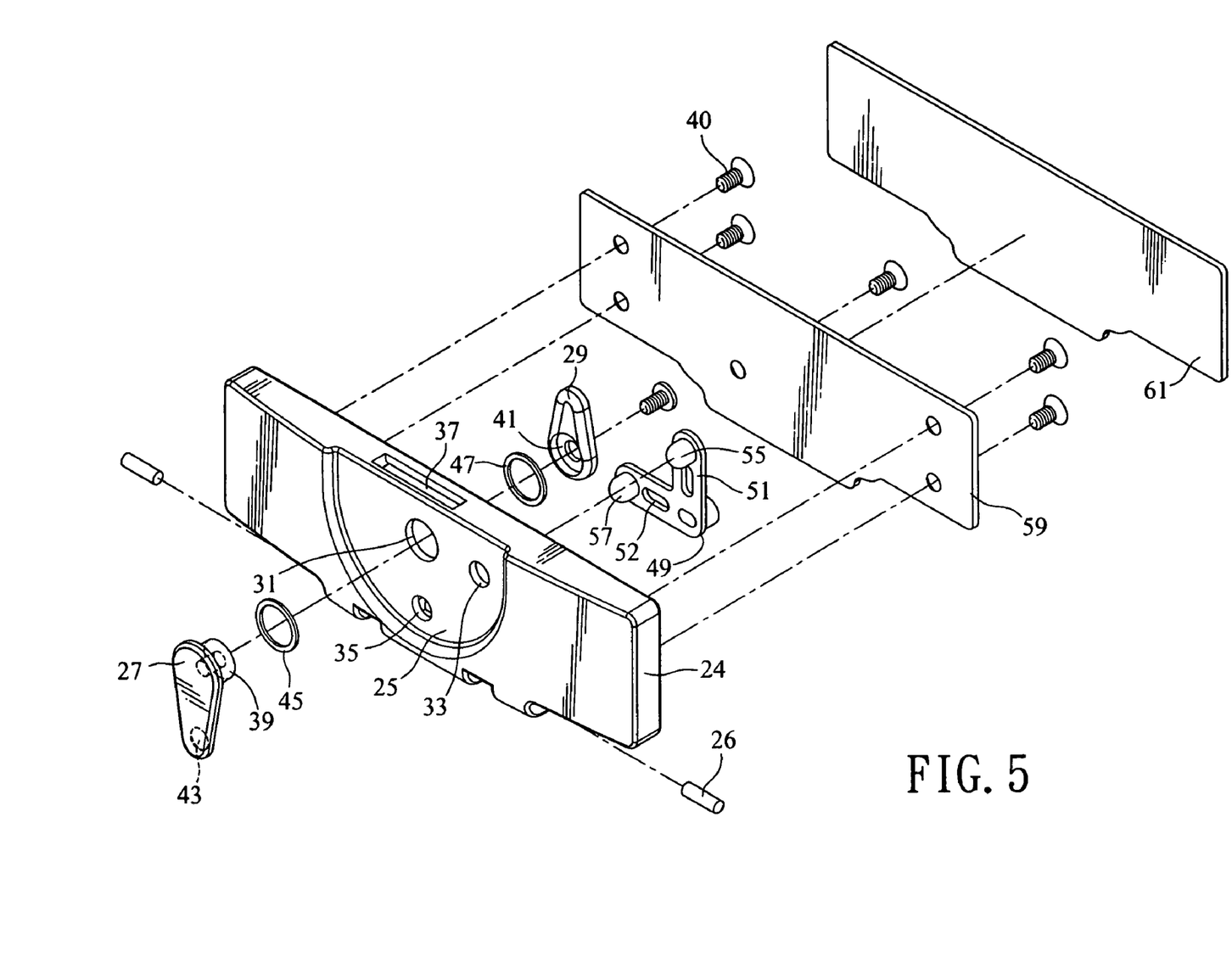
FIG. 5 is an exploded view of the embodiment of the invention.

Referring to FIG. 5, the lid 23 includes a lid body 24. The recess 25 is formed on the surface of the lid body 24 in the center. The recess 25 has an axle bore 31, a first aperture 33 and a second aperture 35 that are equally spaced from the axle bore 31. Namely, with the axle bore 31 serving as the center of a circle, the distance between the axle bore 31 and the first aperture 33, and the distance between the axle bore 31 and the second aperture 35 are the radius of the circle. The second sliding trough 37 is located on the upper side of the lid body 24 corresponding to the first sliding trough 22 and communicating with the axle bore 31.

The lever 27 has one end forming an axle 39 to run through the axle bore 31 and engage with a corresponding hole 41 formed on the latch arm 29, to fasten the lever 27 to the latch arm 29. The lever 27 has another end with a cavity 43 formed thereon. The lever 27 may be turned to rotate the cavity 43 and the latch arm 29 about the axle bore 31 such, that the latch arm 29 also is turning about the axle bore 31 in the second sliding trough 37.

Figure 6A:
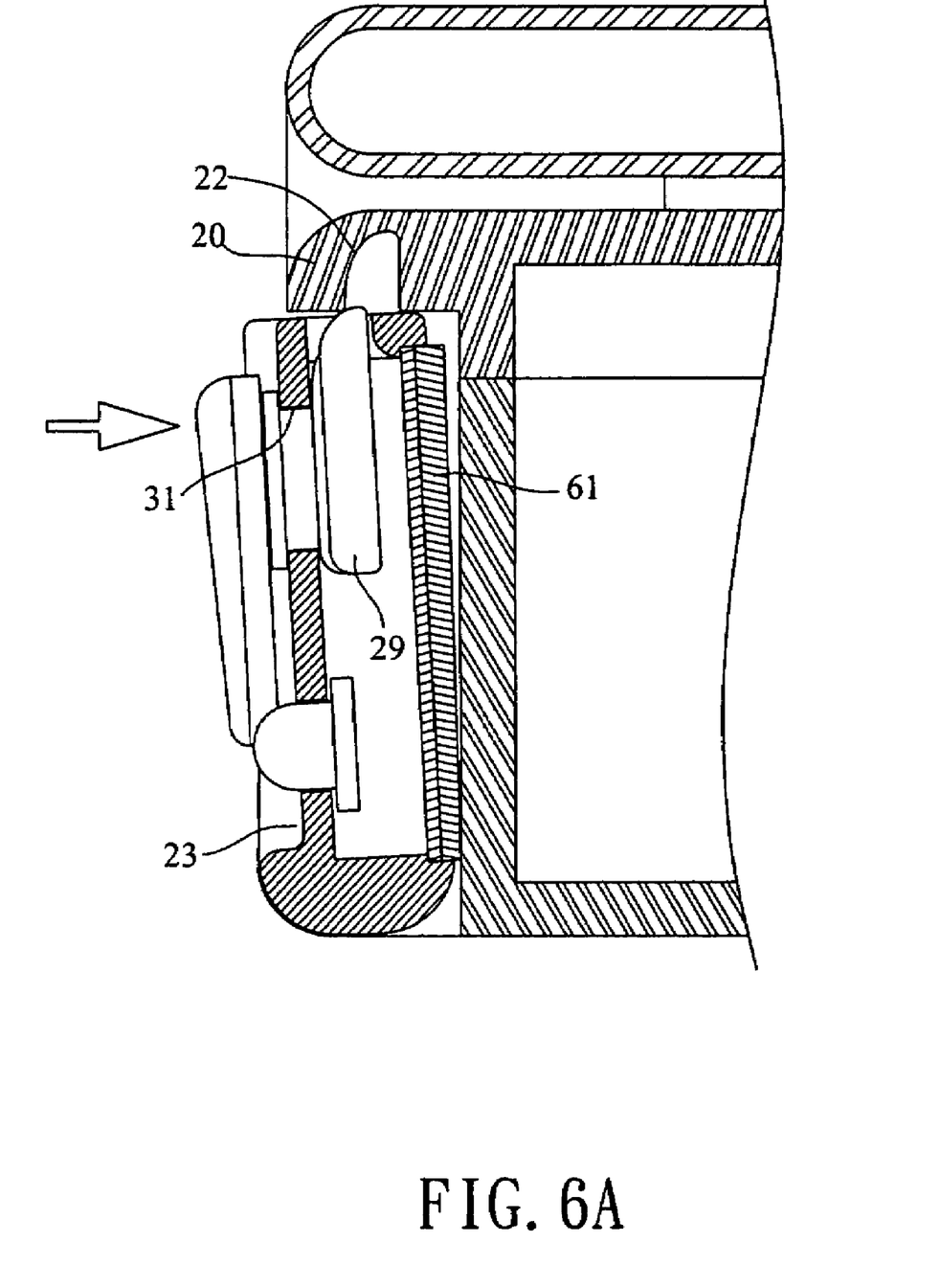
FIGS. 6A and 6B are side views of the lid and latch arm related mechanisms in operating conditions.
Figure 6B:
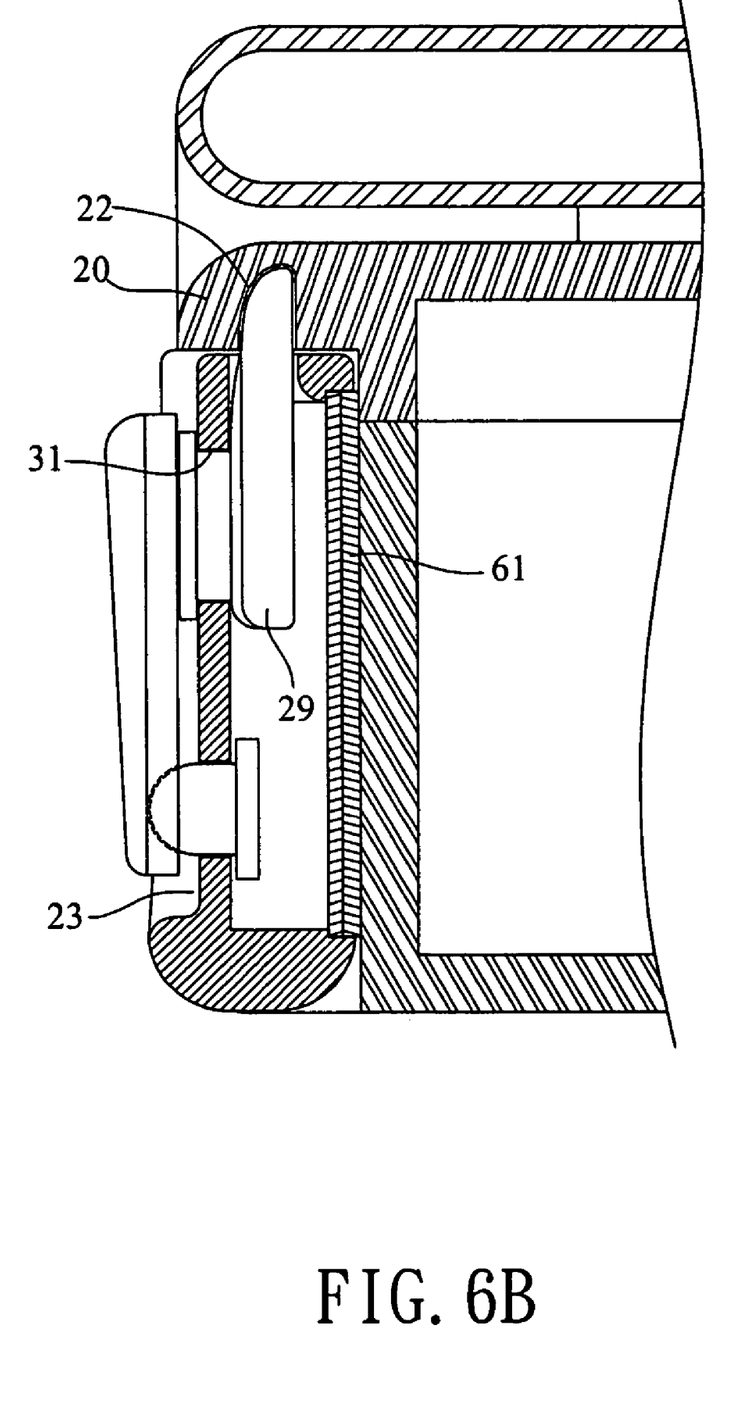

Refer to FIGS. 6A and 6B for the moving mechanisms related to the latch arm. The hole 41 formed on one end of the latch arm 29 is corresponding to the axle bore 31 to receive the axle 39 and to allow the latch arm 29 to be fastened to the lever 27 through a fastening element 40. The latch arm 29 has another end movable in the second sliding trough 37 of the lid body 24.

By means of the construction set forth above, when the lever 27 is turned about the axle bore 31 on the recess 25, the latch arm 29 is driven to rotate, and the other end of the latch arm 29 is moved in or moved out of the second sliding trough 37, and slid out, or in the first sliding trough under forces.

Referring to FIG. 6A, when the lid 23 is in closed condition, the elastic waterproof plate 61 is compressed and the latch arm 29 is wedged into the first sliding trough 22 under forces.

The latch arm 29 has a chamfered angle on a lateral side to facilitate wedging into the first sliding trough 22 in a gradual fashion and compress the waterproof plate 61. Thus the latch arm 29 is tapered on the other end and has a hole 41 formed on the wider end corresponding to the axle bore 31 for coupling with the axle 39 and fastening to the lever 27 through the fastening element 40. The tapered end of the latch arm 29 is movable in the second sliding trough 37.

In addition, a washer 45 may interpose the lever 27 and the axle bore 31. The axle bore 31 and another washer 47 also may interpose the latch arm 29. The washers 45 and 47 may be made from plastic.

The lever 27 may be mounted on the recess 25 in many ways, such as using an anchor plate 49 or directly forming two anchor elements on the lid 23. Take the anchor plate 49 as an example; it has a first anchor arm 51 and a second anchor arm 53 normal to each other. The first anchor arm 51 and the second anchor arm 53 have respectively a first bulged element 55 and a second bulged element 57 on the distal ends thereof. The anchor plate 49 is mounted on an inner side of the lid body 24 with the first bulged element 55 running through the first aperture 33 and extending outside the surface of the recess 25, and the second bulged element 57 running through the second aperture 35 and extending outside the surface of the recess 25. The bulged elements 55 and 57 match the size of the cavity 43 of the lever 27 so that they engage with each other. Thus the lever 27 is anchored on the position of the first aperture 33 or the second aperture 35 by coupling with the first bulged element 55 or the second bulged element 57 that are equivalent to the open/unlatched position, or the closed/anchored position.

The anchor plate 49 has two holes to receive fastening elements 40 to fasten to the lid body 24. The holes may also be corresponding to apertures of an electromagnetic shield plate 59 to receive fastening elements 40, to fasten the anchor plate 49 and the electromagnetic shield plate 59 to the lid body 24.

The electromagnetic shield plate 59 is to guard against electromagnetic waves to prevent electromagnetic interference. It is made of metal foil, a blade consisting of conductive woven material, a composite plate coated with a shielding material, a plastic sheet coated with a conductive paint, or the like.

The waterproof plate 61 aims to prevent moisture from entering the interior of the computer. It may be made from rubber or plastics, and is elastic. Therefore when the lid 23 is closed, the latch arm 29 may be gradually slid and wedged in the first sliding trough 22 under compression. It may be bonded to the backside of the electromagnetic shield plate 59 by adhering.

For assembly, insert the axle 39 of the lever 27 into the washer 45, the axle hole 31 of the recess 25, and another washer 47 to couple with the hole 41 of the latch arm 29. And fasten the lever 27 and the latch arm 29 through the fastening element 40 to the lid body 24. The latch arm 29 is movably located in the second sliding trough 37 of the lid body 24. When the lever 27 is moved on the recess 25, the latch arm 29 is driven and moved in the second sliding trough 37, or slid out of the second sliding trough 37 and wedged in the first sliding trough to anchor the lid 23 on the computer body 20.

The shield plate 59 and the anchor plate 49 are fastened to the inner side of the lid body 24 through the fastening elements 40, with the first bulged element 55 running through the first aperture 33 and extending outside the recess 25, and the second bulged element 57 running through the second aperture 35 and extending outside the recess 25. The waterproof plate 61 is bonded to another side of the shield plate 59. The lid 23 thus finished may be installed in the interface slot opening 21 by coupling the stud shafts 26 on the bottom of the interface slot opening 21.

By means of the construction set forth above, the lid 23 covers the interface slot opening 21 and be anchored on the computer body 20. When the interface slot is to be used, the lid 23 is opened by turning the lever 27 about the axle bore 31 by force from the second bulged element 57 to the first bulged element 55 and latched thereon without sliding away, and the latch arm 29 is moved from the first sliding trough 22 to the second sliding trough 37, to allow the lid 23 to be turned and opened.

On the other hand, when the interface slot is not in use and to be closed by the lid 23, turn the lid 23 to the opening 21, push the lid 23 to depress the water-proof plate 61, and turn the lever 27 about the axle bore 31 from the first bulged element 55 to the second bulged element 57. The latch arm 29 is driven and moved from the second sliding trough 37 to the first sliding trough 22, and wedged in the first sliding trough 22 gradually to anchor the lid 23 on the computer body 20, and also achieve a water-proof effect.

The first bulged element 55 may be defined as the open/unlatched position of the lid, while the second bulged element 57 may be defined as the closed/anchored position. The fastening elements are screws or rivets.

Referring to FIGS. 6A and 6B, one of the features of the invention is the latch arm 29 that has a chamfered angle formed on one lateral side. The first sliding trough may also have a chamfered angle on the entering side to enable the latch arm to slide under forces from the second sliding trough 37 into the first sliding trough 22 and gradually compress the water-proof plate to form an airtight sealing to prevent moisture or dusts from entering the computer.

In summary, the lid mechanism according to the invention has a simple structure that includes an elastic structure, and can reduce damage by decreasing impact. The latch arm has a selected shape to allow the lid to cover the interface slot opening effectively and avoid an adverse effect from moisture or dusts.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A lid mechanism for an interface slot opening of notebook computers, comprising:
   a notebook computer body having an interface slot opening on a lateral side, the opening having a first sliding trough formed on one side thereof; and
   a lid located on the interface slot opening in a turning manner to cover the opening, including:
      a lid body having an axle bore, a second sliding trough formed on a upper side corresponding to the first sliding trough, and an inner surface attaching to a water-proof plate; and
      a latch arm fastened to a lever through the axle bore movable therewith and turning in the second sliding trough;
   wherein the latch arm is allowed to wedge gradually in the first sliding trough, when the lid is closed to compress the waterproof plate.

2. The lid mechanism of claim 1 further having an electromagnetic shield plate interposed between the inner surface of the lid body and the waterproof plate.

3. The lid mechanism of claim 1, wherein the latch arm has a chamfered angle on a lateral side.

4. The lid mechanism of claim 3, wherein the first sliding trough is formed in a selected shape corresponding to the chamfered angle.

5. The lid mechanism of claim 1, wherein the lid body has a recess to hold the lever in a movable manner.

6. The lid mechanism of claim 5, wherein the lid body has a first anchor element to keep the latch arm in the closed condition.

7. The lid mechanism of claim 6, wherein the first anchor element includes a first bulged element extended from the surface of the recess to latch the lever in closed condition.

8. The lid mechanism of claim 6, wherein the lid body has a second anchor element to keep the latch arm in an open condition.

9. The lid mechanism of claim 8, wherein the second anchor element includes a second bulged element extended from the surface of the recess to latch the lever in open condition.

10. The lid mechanism of claim 8, wherein the first anchor element and the second anchor element are normal to form an anchor plate fastening to the lid body.

11. A lid turning on an interface slot opening of a notebook computer for closing the opening, comprising:
    a lid body having an axle bore, a second sliding trough formed on a upper side corresponding to the first sliding trough, and an inner surface attaching to a water-proof plate; and
    a latch arm fastened to a lever through the axle bore movable therewith and turning in the second sliding trough;
    wherein the latch arm is allowed to wedge gradually in the first sliding trough when the lid is closed to compress the waterproof plate.

12. The lid of claim 11 further having an electromagnetic shield plate interposed between the inner surface of the lid body and the waterproof plate.

13. The lid of claim 11, wherein the latch arm has a chamfered angle on a lateral side.

14. The lid of claim 13, wherein the first sliding trough is formed in a selected shape corresponding to the chamfered angle.

15. The lid of claim 11, wherein the lid body has a recess to hold the lever in a movable manner.

16. The lid of claim 15, wherein the lid body has a first anchor element to keep the latch arm in closed condition.

17. The lid of claim 16, wherein the first anchor element includes a first bulged element extended from the surface of the recess to latch the lever in closed condition.

18. The lid of claim 16, wherein the lids body has a second anchor element to keep the latch arm in an open condition.

19. The lid of claim 18, wherein the second anchor element includes a second bulged element extended from the surface of the recess to latch the lever in open condition.

20. The lid of claim 18, wherein the first anchor element and the second anchor element are normal, to form an anchor plate fastening to the lid body.

* * * * *